United States Patent
Malvern et al.

(10) Patent No.: US 6,417,507 B1
(45) Date of Patent: Jul. 9, 2002

(54) MODULATED FIBRE BRAGG GRATING STRAIN GAUGE ASSEMBLY FOR ABSOLUTE GAUGING OF STRAIN

(75) Inventors: Alan Malvern, Plymouth; Thomas Allsop, South Killingholme; Ronald Neal, Plymouth, all of (GB)

(73) Assignee: Bae Systems plc, Farnborough (GB)

(*) Notice: Subject to any disclaimer, the term of this patent is extended or adjusted under 35 U.S.C. 154(b) by 0 days.

(21) Appl. No.: 09/460,715

(22) Filed: Dec. 14, 1999

(30) Foreign Application Priority Data

Dec. 24, 1998 (GB) .............................. 9828469

(51) Int. Cl.$^7$ ................................. G01J 1/42
(52) U.S. Cl. ....................... 250/227.14; 73/800
(58) Field of Search ................ 250/227.14, 227.16, 250/227.17, 227.18, 227.19, 237 G; 356/35.5; 73/800

(56) References Cited

U.S. PATENT DOCUMENTS

| | | | |
|---|---|---|---|
| 5,426,297 A | | 6/1995 | Dunphy et al. ......... 250/227.23 |
| 5,563,967 A | * | 10/1996 | Haake ......................... 385/12 |
| 5,748,312 A | * | 5/1998 | Kersey et al. .............. 356/345 |
| 5,798,521 A | * | 8/1998 | Froggatt ................. 250/227.19 |
| 5,818,585 A | | 10/1998 | Davis et al. ................ 356/345 |
| 5,909,273 A | * | 6/1999 | Malvern .................... 356/35.5 |
| 6,204,920 B1 | * | 3/2001 | Ellerbrock et al. ......... 356/345 |

FOREIGN PATENT DOCUMENTS

| | | |
|---|---|---|
| EP | 0 840 091 | 5/1998 |
| GB | 2 315 548 | 2/1998 |
| WO | WO 97/23766 | 7/1997 |

\* cited by examiner

Primary Examiner—Seungsook Ham
Assistant Examiner—Eric Spears
(74) Attorney, Agent, or Firm—Nixon & Vanderhye P.C.

(57) ABSTRACT

A modulated fibre Bragg grating strain gauge assembly for absolute gauging of strain including at least one sensor element (1) in the form of a length of optical fibre containing, along part its length, means for partially reflecting light (1a), means for generating and passing a beam of light (2a) with a spectral feature less than 0.1 nanometers in width into the at least one sensor element (1) where reflection takes place, which reflection is a substantially sinusoidal intensity variation in wavelength over a range of from 2 to 3 nanometers comprising at least two substantially sinusoidal periods such that as the at least one sensor element sustains a change in length resulting from a strain thereon, the reflected intensity varies substantially sinusoidally along the at least two sinusoidal periods, means for receiving and processing the reflected light (2b) to establish the light intensity values at one (1f) and two times (2f) a modulation frequency (1f) applied to the means for generating the beam of light (2a), and means to determine an absolute direction and magnitude of strain from a ratio of the intensity values 1f:2f.

21 Claims, 11 Drawing Sheets

LINEARLY VARYING CHIRP 17

LINEARLY VARYING CHIRP

PITCH

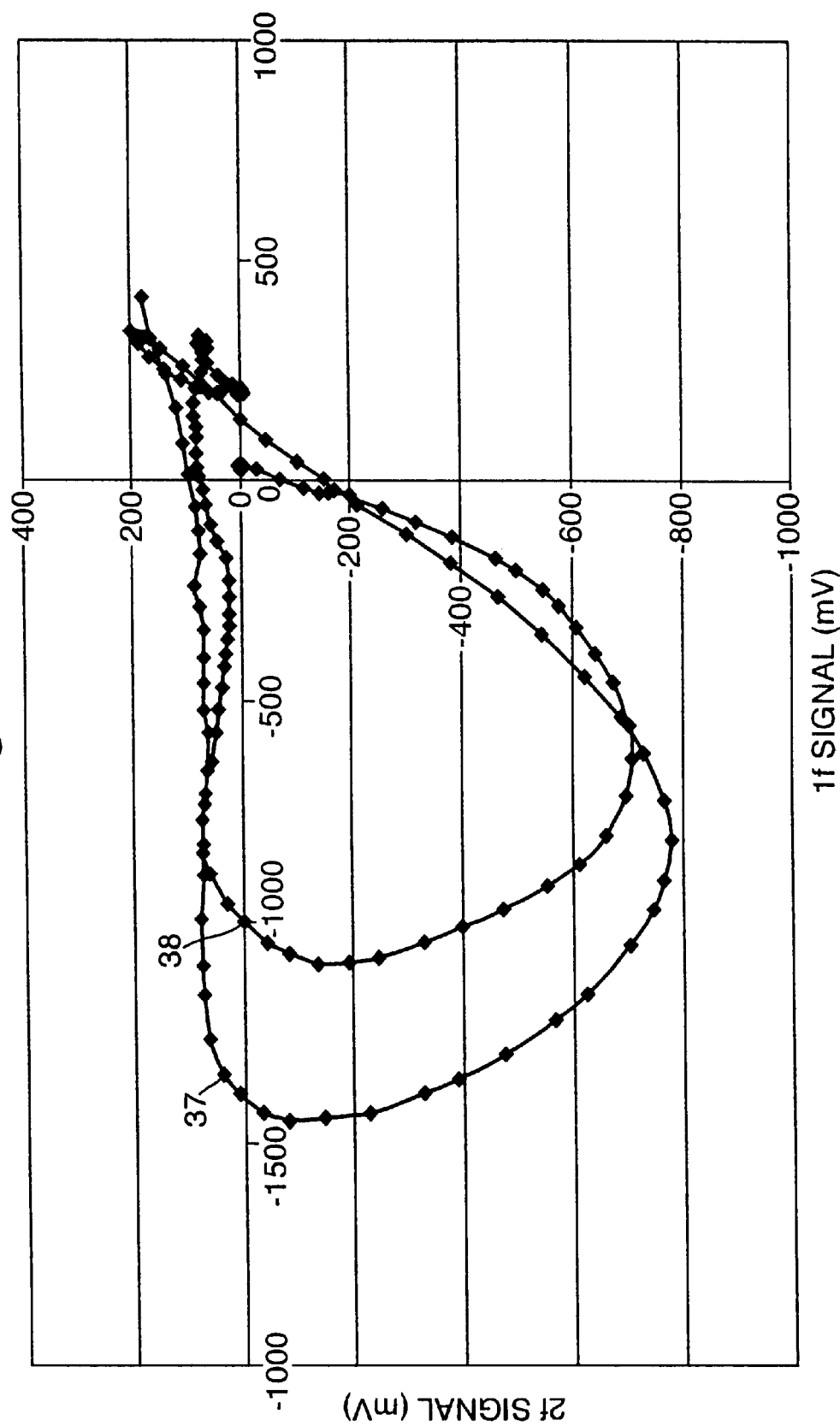

MODULATED FIBRE BRAGG GRATING STRAIN GAUGE ASSEMBLY FOR ABSOLUTE GAUGING OF STRAIN

BACKGROUND OF THE INVENTION

1. Field of the Invention

This invention relates to a modulated fibre Bragg grating strain gauge assembly suitable particularly, but not exclusively, for absolute gauging of strain.

2. Discussion of Prior Art

Conventional electrical strain gauges require a relatively large number of electrical lead outs which increases their weight and expense. Additionally such conventional electrical strain gauges are subject to electromagnetic noise which can give rise to false or distorted readings. This makes such conventional gauges relatively unsatisfactory for use on aircraft either as the retrofit assembly or as part of a composite panel assembly. Moreover in an aircraft application the use of electrical cables means that they can be damaged by lightening strikes with consequent reduction in reliability and life of the strain gauge assembly. Fibre optic strain gauges, such as is disclosed in patent application EP-840091-A2, offer particular advantages in airframe structures in terms of health monitoring as they are passive, can be embedded into composite structures, are not subject to lightening strikes and electromagnetic interference, and can be considered 'fit for life' sensors. However, the fibre optic sensors presently used for strain gauge monitoring, namely the fibre Fabry perot interferometer and the fibre Bragg grating, each have practical limitations associated therewith. The fibre Fabry perot interferometer, although it achieves a high strain resolution and an excellent signal to noise ratio, is not an absolute gauge and it is difficult to multiplex a matrix of these devices over a fibre optic network. The fibre Bragg grating can achieve absolute gauging of strain and is better suited to multiplexing than the fibre Fabry perot interferometer, but the signal to noise ratio is poor both as a result of the conventional broadband light source used, and because standard fibre Bragg gratings only reflect light over a narrow waveband.

There is therefore a need for a fibre optic strain gauge sensor which has a good signal to noise ratio, a sufficiently wide reflection waveband to measure strain over a desired strain range, provides absolute gauging of strain, and allows multiplexing of many sensors from common light sources.

SUMMARY OF THE INVENTION

According to a first aspect of the present invention there is provided a modulated fibre Bragg grating strain gauge assembly for absolute gauging of strain including at least one sensor element in the form of a length of optical fibre containing, along part its length, means for partially reflecting light, means for generating and passing a beam of light with a spectral feature less than 0.1 nanometers in width into the at least one sensor element where reflection takes place, which reflection is a substantially sinusoidal intensity variation in wavelength over a range of from 2 to 3 nanometers comprising at least two substantially sinusoidal periods such that as the at least one sensor element sustains a change in length resulting from a strain thereon, the reflected intensity varies substantially sinusoidally along the at least two sinusoidal periods, means for receiving and processing the reflected light to establish the light intensity values at one (1f) and two times (2f) a modulation frequency (1f) applied to the means for generating the beam of light, and means to determine an absolute direction and magnitude of strain from a ratio of the intensity values 1f:2f.

Preferably the means for generating and passing a beam of light into the at least one sensor element includes a light generating source in the form of a semiconductor laser, a non-return isolator for receiving the beam of light from the laser, a waveguide splitter unit for splitting the light received from the isolator into at least one output light beam and at least one coupler, each for receiving one of the at least one output light beams and for passing it into one of the at least one sensor elements.

Conveniently each coupler is each operable to split the received light beam into two sub-beams, one of which is passed directly into one of the at least one sensor elements via a single mode optical fibre, and to receive from the respective at least one sensor element the light reflected therefrom.

Advantageously the means for receiving and processing the reflected light includes at least one photodetector for receiving the reflected light from the coupler, at least one pair of lockin detectors operable to sample the reflected light output from the photodetector, one at a frequency of 1f and the other at a frequency of 2f, and demodulate the samples at these two frequencies, and means for logging the demodulated samples and for establishing the phase relationship between the 1f and 2f values.

Preferably the means for partially reflecting light is a single Bragg grating.

Conveniently the laser source light is tuneable to a midpoint of the single Bragg grating.

Advantageously the means for partially reflecting light is a series of single Bragg gratings, each of which gratings resonates at a unique frequency.

According to a further aspect of the present invention the means for generating and passing the beam of light into the at least one sensor element includes a plurality of light generating sources each in the form of a semiconductor laser, each of which lasers is uniquely tuned to a midpoint of one of the series of single Bragg gratings and has a unique and selectable frequency modulation $1f_i$ imposed thereon, a plurality of non-return isolators for receiving an output from each of the corresponding lasers, a combining unit for combining the outputs from each of the plurality of isolators, which combined outputs provide at least one output light beam passable into each of the at least one sensor elements, and at least one coupler each for receiving one output light beam from the combining unit and passing it into one of the at least one sensor elements.

Preferably the means for receiving and processing the reflected light from each of the series of single Bragg gratings includes at least one photodetector for receiving the reflected light from the respective coupler and a plurality of pairs of lockin detectors operable to sample the reflected light output from the detector, one at each corresponding $1f_i$ and the other at each corresponding $2f_i$ frequency.

Conveniently the or each single Bragg grating is of a type made by a programmable ultra violet interference fabrication process operable to impose a variation in refractive index depth and pitch therealong, thereby providing the required substantially sinusoidal variation of reflected light intensity.

Advantageously the ultra violet interference system is operable to impose a linearly varying pitch on the or each single Bragg grating.

Preferably the substantially sinusoidal variation of reflected light intensity has two periods, which two periods are provided by the ultra violet interference system operable to impose a sinusoidal refractive index depth variation along the or each single Bragg grating, which sinusoidal refractive index depth variation has a frequency and amplitude selectable to provide no more than four periods therealong.

Conveniently the substantially sinusoidal variation of reflected light intensity has three periods, which three periods are provided by the ultra violet interference system operable to impose a sinusoidal refractive index depth variation along the or each single Bragg grating, which sinusoidal refractive index depth variation has a frequency and amplitude selectable to provide at least five periods therealong.

Advantageously the substantially sinusoidal variation of reflected light intensity has three or more periods, which three or more periods are provided by the ultra violet interference system operable to superimpose a sinusoidal variation of pitch on the linearly varying pitch.

Preferably the means to determine an absolute direction and magnitude of strain from the strain gauge assembly includes calibrating means for calibrating the ratio of intensity values 1f:2f, and means for locating the ratio of 1f:2f within one of the at least two substantially sinusoidal periods.

Conveniently the calibrating means includes a first calibration Bragg grating, a second calibration Bragg grating, the waveguide splitter unit having three output light beams, three couplers and three sensor elements.

Advantageously the first calibration Bragg grating is locatable along part of a first of the three output sensor elements, is unstrained and locatable in a controlled temperature environment thereby providing a temperature stabilised ratio of the intensity values $(1f:2f)_T$, the single Bragg grating is locatable along a second of the three output sensor elements, and the second calibration Bragg grating is locatable along a third of the three output sensor elements, is unstrained, subject to substantially identical environmental conditions to the single Bragg grating and provides an unstrained ratio of the intensity values $(1f:2f)_U$, which unstrained ratio $(1f:2f)_U$, temperature stabilised ratio $(1f:2f)_T$ and the means for locating the ratio 1f:2f within one of the at least two sinusoidal periods are combinable with the ratio of the intensity values 1f:2f relating to the single Bragg grating, to determine the phase relationship from which an absolute direction and magnitude of the strain on the single Bragg grating can be established.

Preferably the calibrating means includes a series of first calibration Bragg gratings, each of which first calibration Bragg gratings is locatable along one of the at least one sensor elements, is unstrained and locatable in a controlled temperature environment thereby providing a series of temperature stabilised ratios of the intensity values $(1f_i:2f_i)_T$, and a series of second calibration Bragg gratings, each of which second calibration gratings is locatable along one of the at least one sensor elements, is unstrained, subject to substantially identical environmental conditions to each respective single Bragg grating and provides a series of unstrained ratios of the intensity values $(1f_i:2f_i)_U$, which unstrained ratios $(1f_i:2f_i)_U$, temperature stabilised ratios $(1f_i:2f_i)_T$ and the means for locating the ratios $1f_i:2f_i$ within one of the at least two sinusoidal periods are combinable with the ratio of the intensity values $1f_i:2f_i$ relating to each respective single Bragg grating, to determine the phase relationship from which an absolute direction and magnitude of the strain on each single respective Bragg grating can be established.

Conveniently each of said first and second calibration Bragg gratings is of a type made by a programmable ultra violet interference fabrication process operable to impose a variation in refractive index depth and pitch therealong, thereby providing a substantially sinusoidal variation of reflected light intensity.

Advantageously the series of single Bragg gratings and the series of first and second calibration gratings each includes five single Bragg gratings.

Preferably there are provided five sensor elements and five photodetectors.

BRIEF DESCRIPTION OF THE DRAWINGS

For a better understanding of the present invention, and to show how the same may be carried into effect, reference will now be made, by way of example, to the accompanying drawings, in which:

FIG. 15 is a graphical representation of two output signals relating to one and two times the modulation frequency f as a function of strain applied to a sensor element of the assembly of the invention plotted against each other to form a Lissajous figure.

DETAILED DISCUSSION OF EMBODIMENTS

A modulated fibre Bragg grating strain gauge assembly of the invention for absolute gauging of strain as shown in FIGS. 1 to 15 is intended for use in situations where reliability of the strain sensors is crucial to the monitoring of the artefact under strain. This is particularly important in the aerospace industry, where environmental conditions typically include a range of electro-mechanical hazards such as lightening strike and corrosion.

Figure 1:
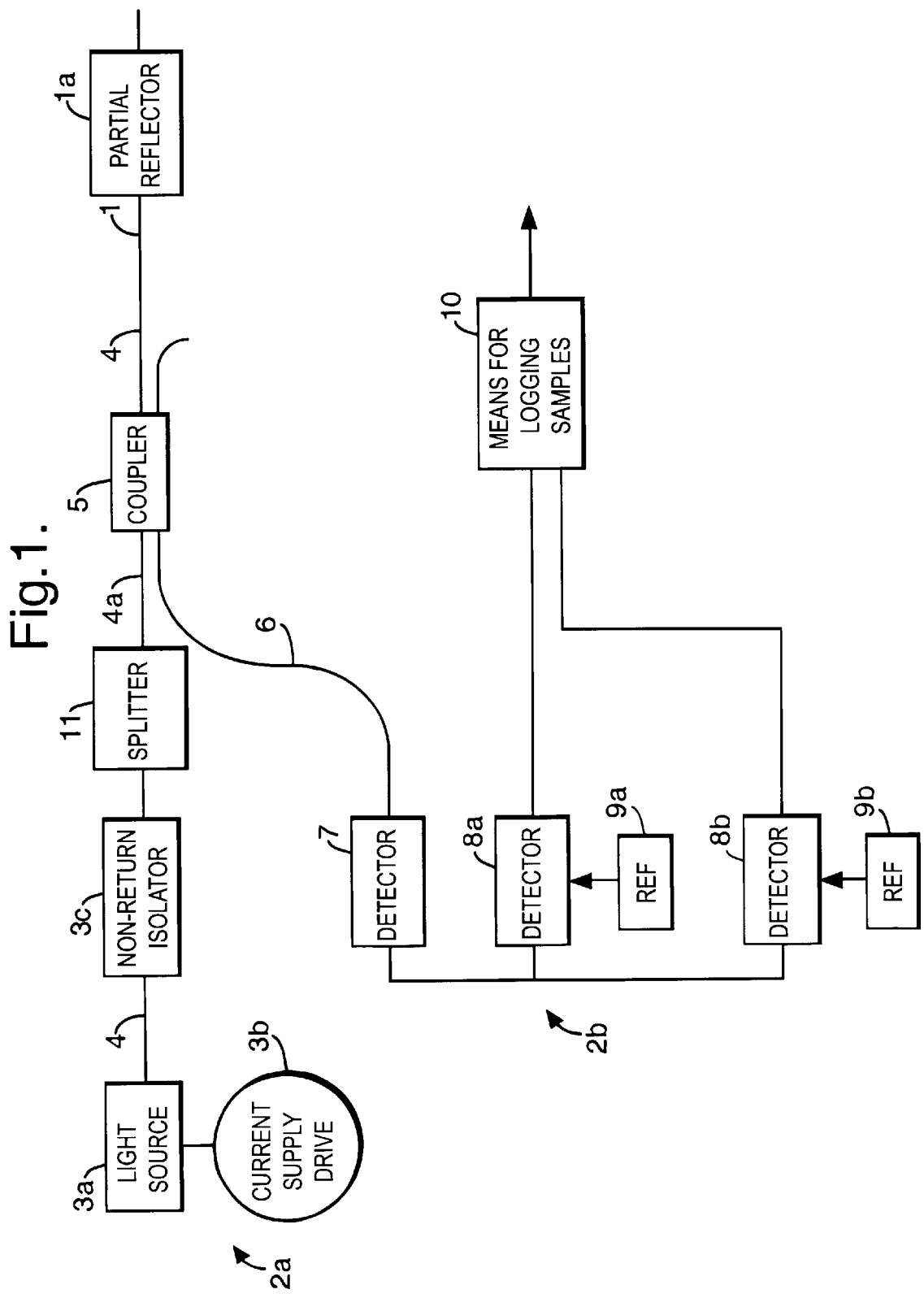
FIG. 1 is a schematic block diagram of a modulated fibre Bragg grating strain gauge assembly for absolute gauging of strain having a single modulated fibre Bragg grating according to a first embodiment of the present invention.
Figure 11:
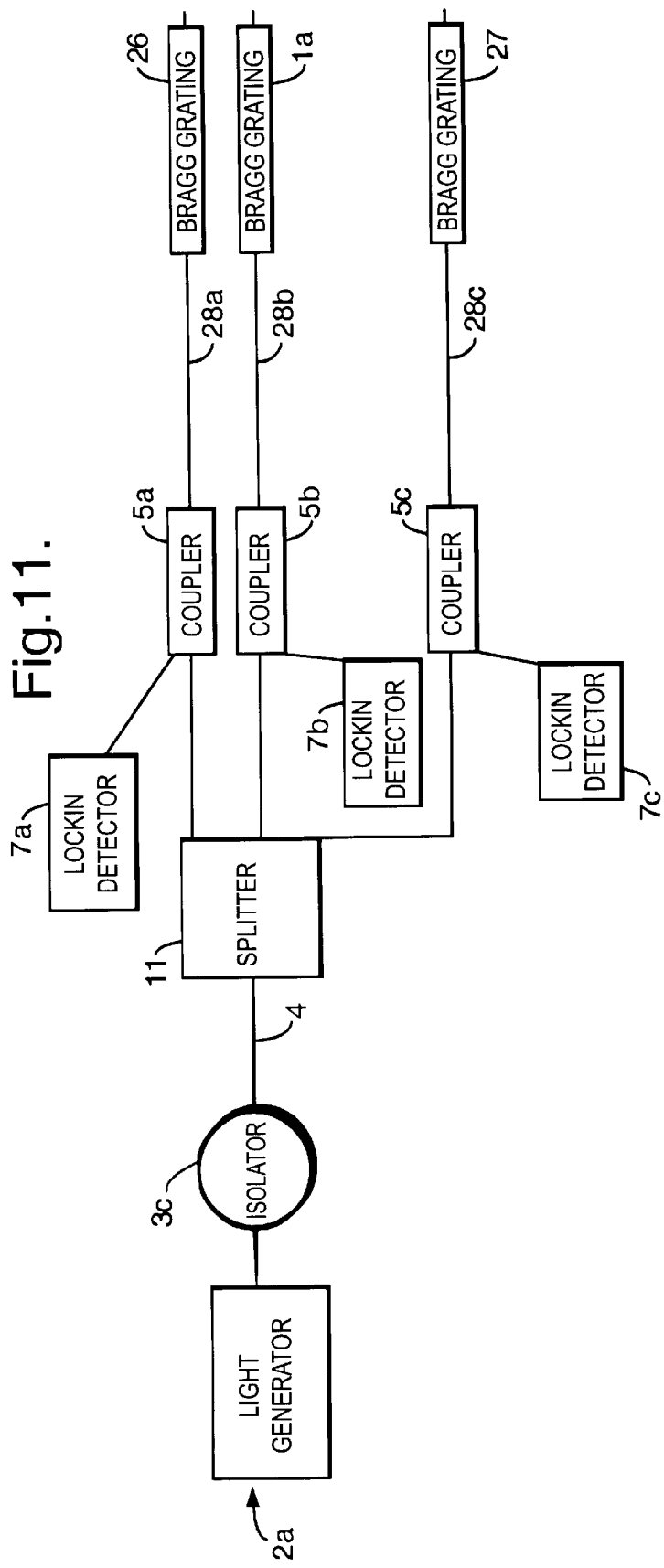
FIG. 11 is a schematic block diagram of the assembly of FIG. 1, showing calibrating means according to the embodiment of FIG. 1.

Thus a modulated fibre Bragg grating strain gauge assembly for absolute gauging of strain as shown schematically in FIG. 1 according to a first embodiment of the present invention includes at least one sensor element 1 in the form of a length of optical fibre containing, along part its length, means for partially reflecting light 1a, and means 2a for generating and passing a beam of light with a spectral feature less than 0.1 nanometers in width into the at least one sensor element 1 where reflection takes place. This reflection is a substantially sinusoidal intensity variation in wavelength over a range of from 2 to 3 nanometers comprising at least two substantially sinusoidal periods, such that as the at least one sensor element sustains a change in length resulting from a strain thereon, the reflected intensity varies substantially sinusoidally along the at least two sinusoidal periods. FIG. 1 also shows means for receiving and processing the reflected light 2b to establish the light intensity values at one (1f) and two times (2f a modulation frequency (1f) applied to the means for generating the beam of light 2a, and FIG. 11 shows means to determine an absolute direction and magnitude of strain from a ratio of the intensity values 1f:2f.

The means 2a for generating and passing a beam of light into the sensor element 1 includes a light generating source 3a preferably in the form of a semiconductor laser provided with a current supply drive 3b operable to provide an injection current to the laser modulated at a frequency f, a non-return isolator 3c for receiving the beam of light from the laser 3a via an optical fibre 4, a waveguide splitter unit 11 for splitting the light received from the isolator into at least one output light beam 4a, and at least one coupler 5, each for receiving one of the at least one output light beams 4a and for passing it into one of the at least one sensor elements 1 via a further optical fibre 4. Each coupler 5 is operable to receive from one sensor element 1, the light reflected therefrom and to pass this via an optical fibre 6 to a photodetector 7. Such a photodetector 7 forms part of the means for receiving and processing the reflected light. Also forming part of these means are two lockin detectors 8a and 8b operable to sample the reflected light output from the photodetector 7. The frequency 1f is the operating frequency (f) at which the laser 3a is driven by the laser drive 3b and this may be 10 kHz. The detector Ba detects the amount of reflected light of frequency 1f using a frequency reference 9a, and the detector 8b detects the amount of reflected light at the frequency 2f using a frequency reference 9b of 2f, each by demodulating the samples at these two frequencies. The assembly also includes means 10 for logging the demodulated samples received from the detectors 8a and 8b and for establishing the phase relationship between the 1f and 2f values.

The means for partially reflecting light 1a, as shown in FIG. 1, is a single Bragg grating, and the laser source light 3a is preferably tuned to within 0.5 nanometers of a midpoint thereof in order to effect optimal reflection therefrom.

Figure 2:
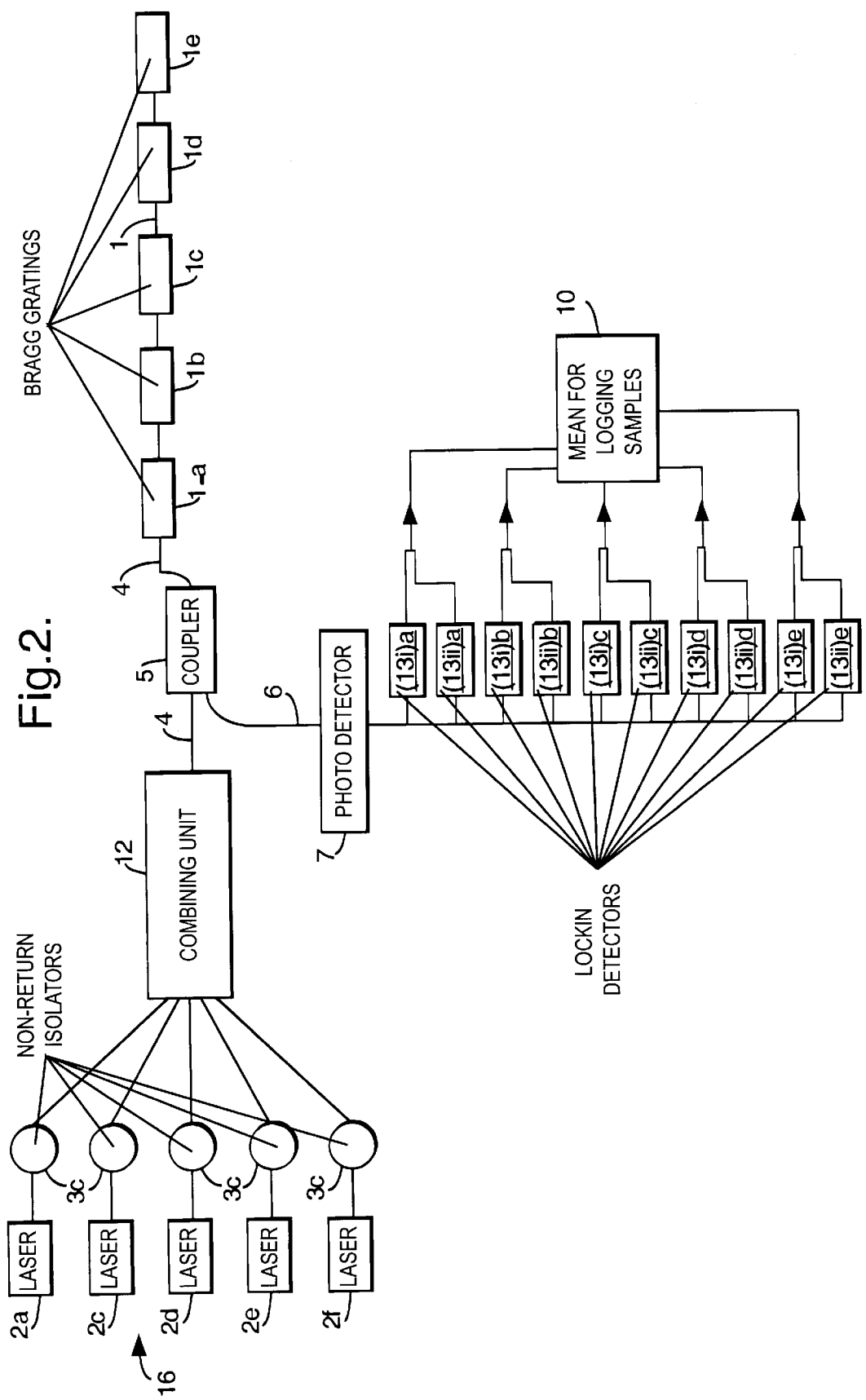
FIG. 2 is a schematic block diagram of a modulated fibre Bragg grating strain gauge assembly for absolute gauging of strain having a series of five modulated fibre Bragg gratings according to a second embodiment of the present invention.
Figure 3:
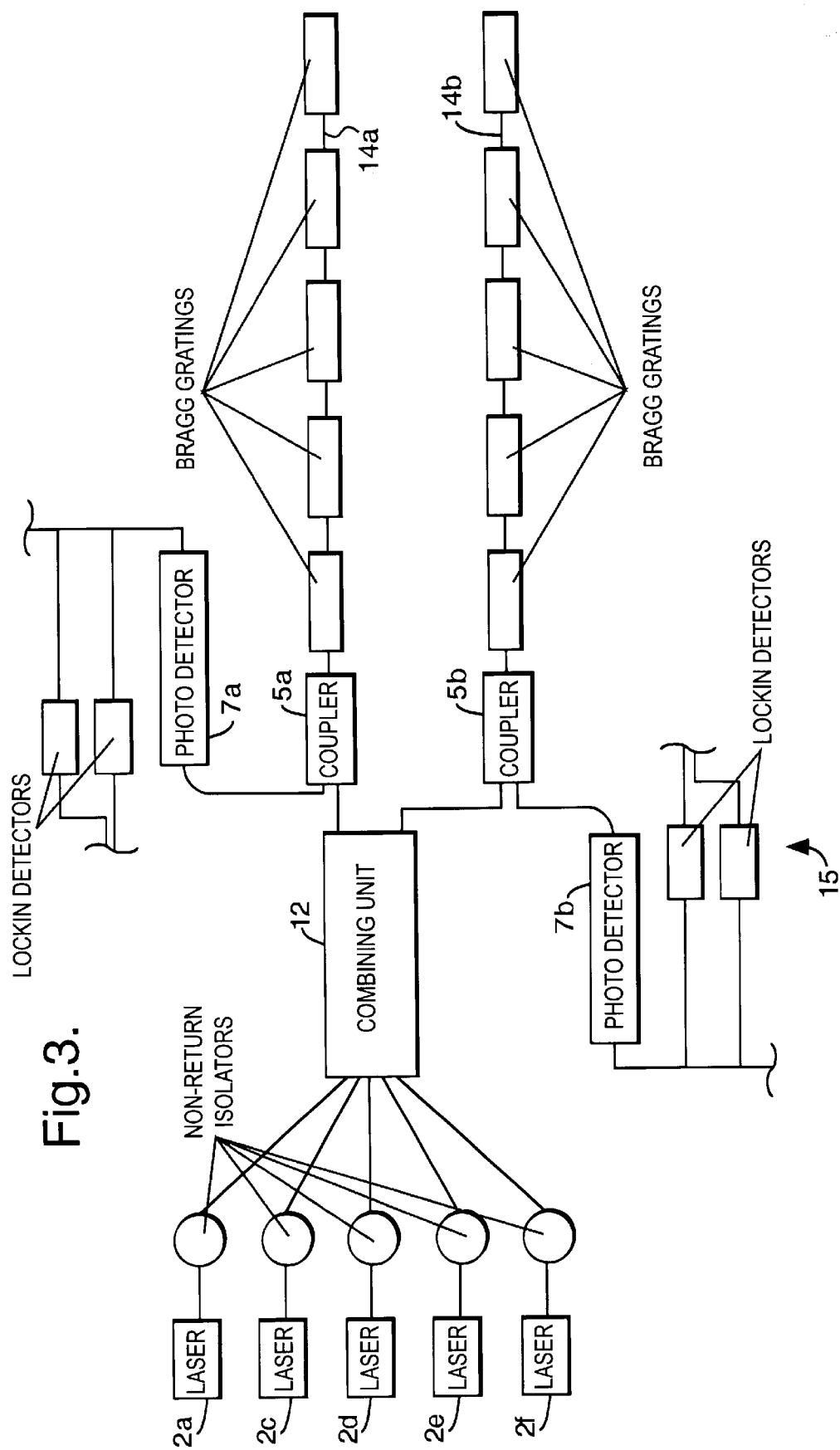
FIG. 3 is a schematic block diagram of the assembly of FIG. 2 having two sensor elements.
Figure 4:
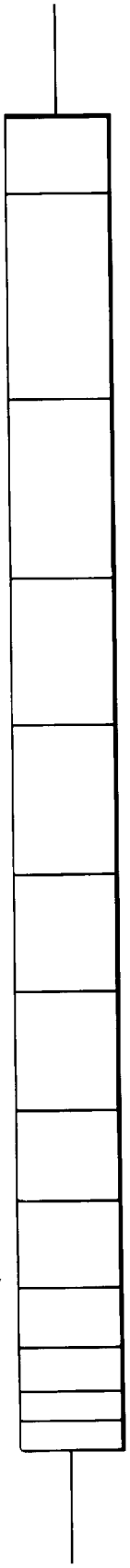
FIG. 4 is a figurative representation of part of FIG. 1 or 2 showing a modulated fibre Bragg grating fabricated with a linear chirp therealong.

FIG. 2 of the accompanying drawings shows a modulated fibre Bragg grating assembly for absolute gauging according to a second embodiment of the present invention, which second embodiment is generally similar to that of FIG. 1, in which like parts have been given like reference numerals and will not be described further in detail. The sensor element 1 comprises a series of five single Bragg gratings 1a, 1b, 1c, 1d, 1e as shown in FIG. 2, each of which gratings resonates at a unique frequency. The means for generating and passing a beam of light into the sensor element 1 includes five light generating sources 16 each in the form of a semi-conductor laser 2a, 2c, 2d, 2e, 2f, each of which lasers is uniquely tuned to within 0.5 nanometers of a midpoint of one of the series of single Bragg gratings 1a, 1b, 1c, 1d, 1e and has a unique and selectable frequency modulation $1f_{a,b,c,d,e}$ imposed thereon. Furthermore each laser source wavelength is shifted with respect to each other laser source wavelength such that when each of the single Bragg gratings 1a, 1b, 1c, 1d, 1e is strained, there is no overlap between each corresponding 2 to 3 nm reflection waveband. The embodiment of FIG. 2 correspondingly includes five non-return isolators 3c and the output therefrom is combined in a combining unit 12 in order to provide at least one beam of light passable into the coupler 5 and from thence into the sensor element 1. The means for receiving and processing the reflected light from each of the series of five single Bragg gratings 1a, 1b, 1c, 1d, 1e includes a photodetector 7, five pairs of lockin detectors $(13i, 13ii)_a$ $(13i, 13ii)_b$ $(13i, 13ii)_c$ $(13i, 13ii)_d$ $(13i, 13ii)_e$, wherein each of the five pairs of lockin detectors $(13i, 13ii)_a$ $(13i, 13ii)_b$ $(13i, 13ii)_c$ $(13i, 13ii)_d$ $(13i, 13ii)_e$ corresponds to one and two times a modulation frequency $1f_{a,b,c,d,e}$ applied to one of each of the five lasers 2a, 2c, 2d, 2e, 2f. The second embodiment of the present invention may be configured to include more than one sensor element 1 and a corresponding number of photodetectors. FIG. 3 shows such an arrangement having two couplers 5a, 5b, two sensor elements 14a, 14b, two photodetectors 7a, 7b, and a matrix of pairs of lockin detectors given by the number of sensor elements and the number of single Bragg gratings along the sensor elements, as shown generally by reference numeral 15.

Figure 5:
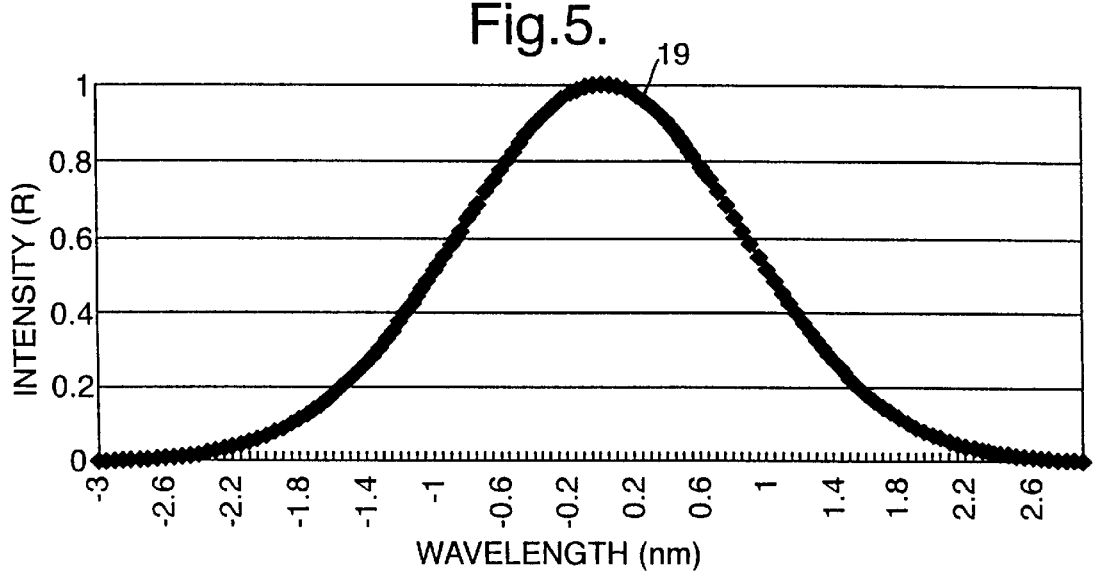
FIG. 5 is a graphical representation of intensity versus wavelength for a single Bragg grating with a linear chirp.
Figure 6:
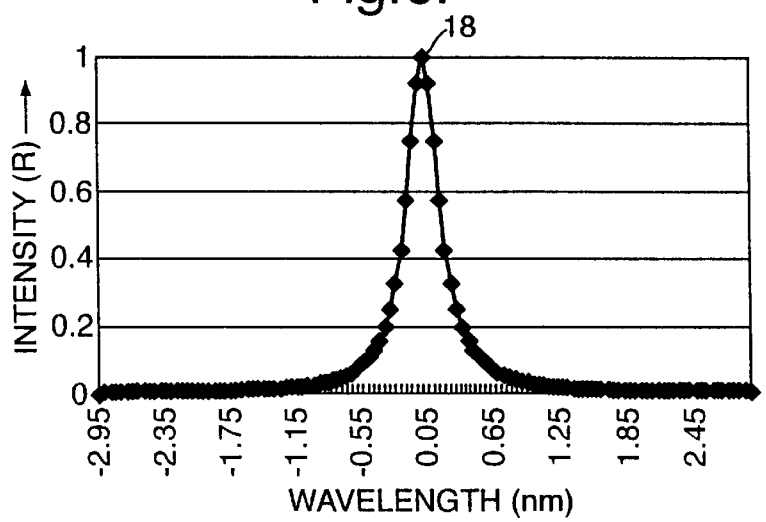
FIG. 6 is a graphical representation of intensity versus wavelength for a standard fibre Bragg grating.

The or each single Bragg grating 1a, 1b, 1c, 1d, 1e shown in FIGS. 1 and 2 is of a type made by a programmable ultra violet interference fabrication process operable to impose a variation in refractive index depth and pitch therealong. The fabrication process imposes, on all of the or each single Bragg gratings 1a, 1b, 1c, 1d, 1e, a linearly varying chirp 17, which, as shown in FIGS. 5 and 6, effects an increase in waveband of the or each single Bragg grating 1a 1b, 1c, 1d, 1e from 0.1 nanometers 18 to between 2 and 3 nanometers 19.

Figure 7:
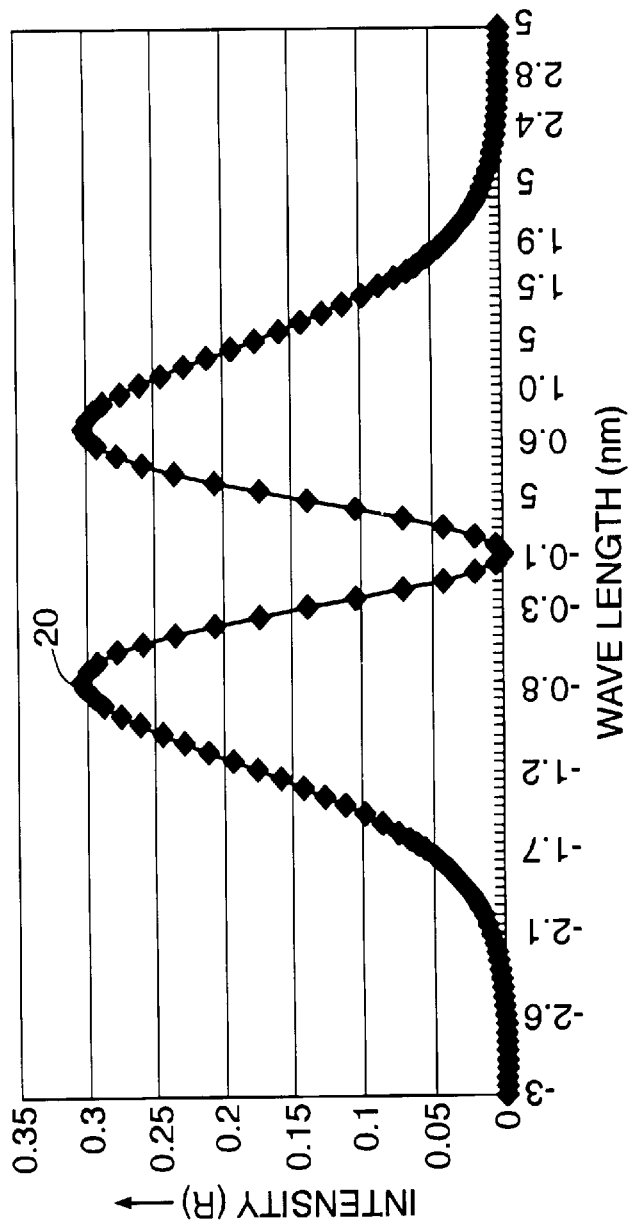
FIG. 7 is a graphical representation of intensity versus wavelength showing a sinusoidal reflection response from a single Bragg grating having two peaks, according to either of the embodiments of FIG. 1 or 2.
Figure 8:
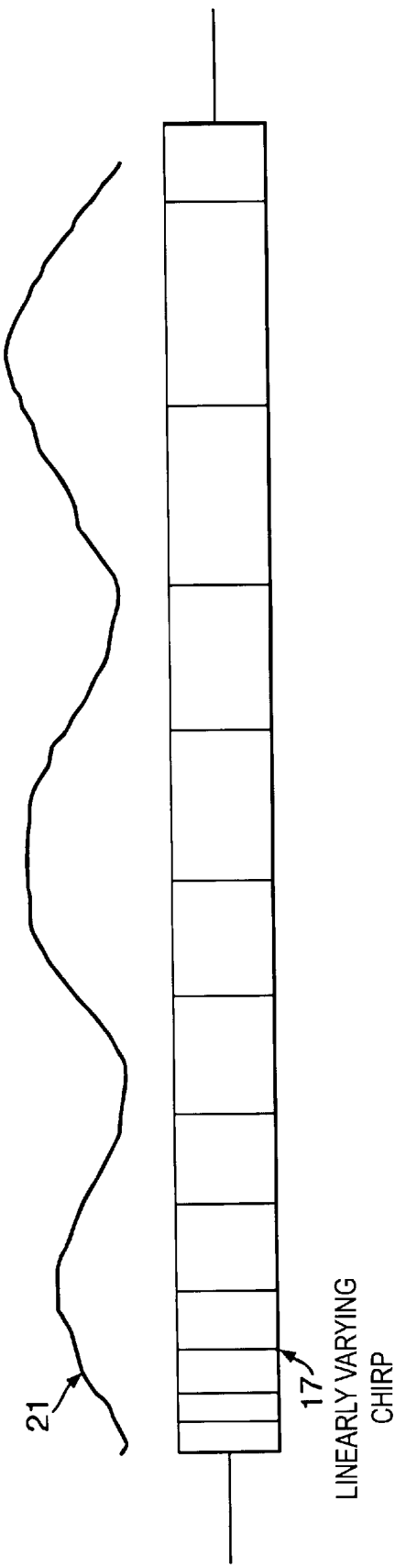
FIG. 8 is a figurative representation of part of FIG. 1 or 2 showing a modulated fibre Bragg grating fabricated with a sine wave variation in depth of refractive index and a linear chirp imposed therealong according to the embodiments of FIG. 1 or 2.

The substantially sinusoidal variation of reflected light intensity comprising two sinusoidal periods 20 as shown in FIG. 7 is achieved by imposing a sinusoidal variation of refractive index depth 21, FIG. 8, on the linear chirp 17 with the ultra violet interference system. A figurative representation is presented in FIG. 8 to show the superposition of the refractive index depth variation 21 on the linear chirp 17. The number of periods, two or three 20, 22, comprising the substantially sinusoidal variation of reflected light is controlled by refractive index depth frequency and amplitude parameters. Thus four periods or less of refractive index depth variation 21 provides two sinusoidal periods 20, FIG. 7, and five or more periods of refractive index depth variation 21 provides three sinusoidal periods 22, FIG. 10.

Figure 9:
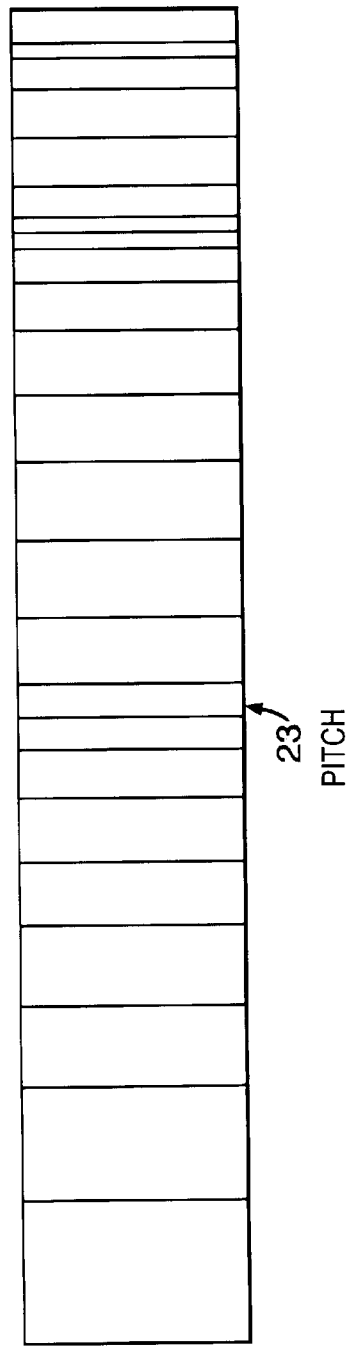
FIG. 9 is a figurative representation of part of FIG. 1 or 2 showing a modulated fibre Bragg grating fabricated with a sine wave modulation of pitch and a linear chirp imposed therealong according to the embodiments of FIG. 1 or 2.
Figure 10:
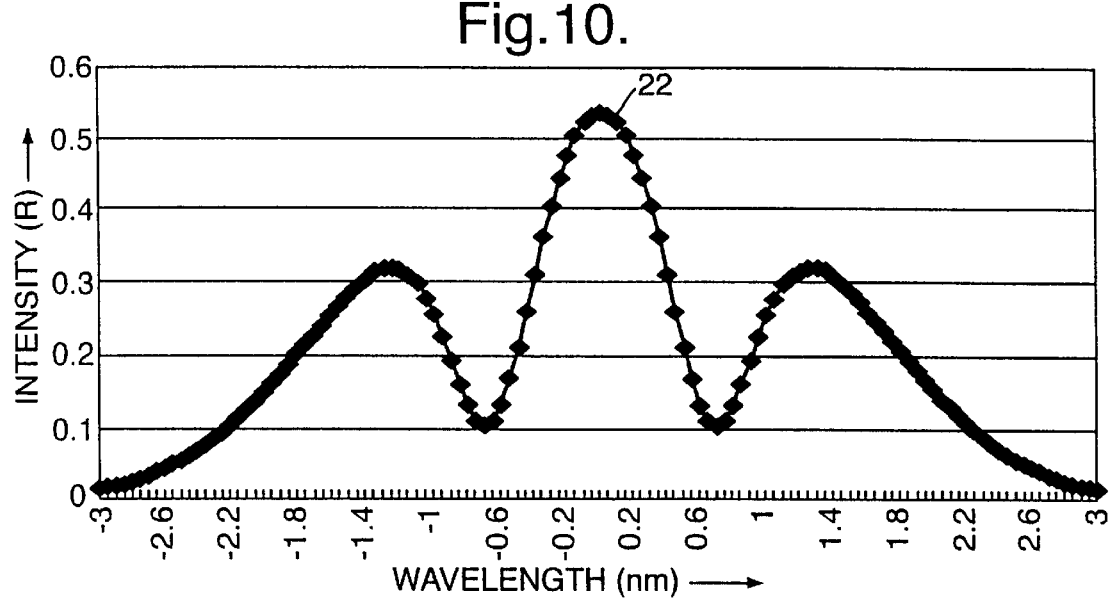
FIG. 10 is a graphical representation of intensity versus wavelength showing a sinusoidal reflection response from a single Bragg grating having three peaks, according to the embodiments of FIG. 1 or 2.

An alternative means of providing the three period substantially sinusoidal variation of reflected light intensity 22 shown in FIG. 10 is by superimposing a sinusoidal variation of pitch 23 on the linear chirp 17, shown in FIG. 9, which sinusoidal pitch variation 23 is controllable through a selection of characteristic frequency and amplitude pitch parameters and imposed by the ultra violet interference system.

The means to determine an absolute direction and magnitude of strain from a ratio of the intensity values 1f:2f for the or each single Bragg grating 1a, 1b, 1c, 1d, 1e, where 1f interchangeably references the modulation frequency f in the assembly of FIG. 1, or any one of modulation frequencies $f_{a,b,c,d,e}$ in the assembly of FIG. 2, is provided by calibrating means for calibrating the ratio of 1f:2f, and by means for locating the ratio of 1f:2f within one of the at least two substantially sinusoidal periods 20, 22.

The calibrating means corresponding to the first embodiment of the present invention preferably includes the waveguide splitter unit 11, as shown in FIG. 11, having three output light beams and three couplers 5a, 5b, 5c each operable to split the output light beam into two sub-beams one of which is passed directly into each respective output sensor elements 28a, 28b, 28c, three or more photodetectors and pairs of lockin detectors 7a, 7b, 7c, each of which photodetectors receives the reflected light from a respective coupler, a first calibration Bragg grating 26, and a second calibration Bragg grating 27. The first calibration Bragg grating 26 is locatable along part of a first of the three output sensor elements 28a, is unstrained and is locatable in a controlled temperature environment, thereby providing a temperature stabilised ratio of the intensity values $(1f:2f)_T$. The single Bragg grating 1a is locatable along a second of the three output sensor elements 28b and the second calibration grating 27 is locatable along a third of the three output sensor elements 28c. The second calibration grating 27 is unstrained and subject to identical environmental conditions as the single Bragg grating 1a, and this provides an unstrained ratio of the intensity values $(1f:2f_U)$. Both the first and second calibration gratings are of a type made by a programmable ultra violet interference fabrication process, substantially as hereinbefore described in relation to the single Bragg grating. The two ratios, $(1f:2)_T$ and $(1f:2f_U)$, and the means for locating the single Bragg grating ratio of intensity 1f:2f within one of the at least two sinusoidal periods 20, 22 are combinable with the ratio of the intensity values 1f:2f, to determine the phase relationship, from which an absolute direction and magnitude of the strain on the single Bragg grating 1a can be established.

Figure 12:
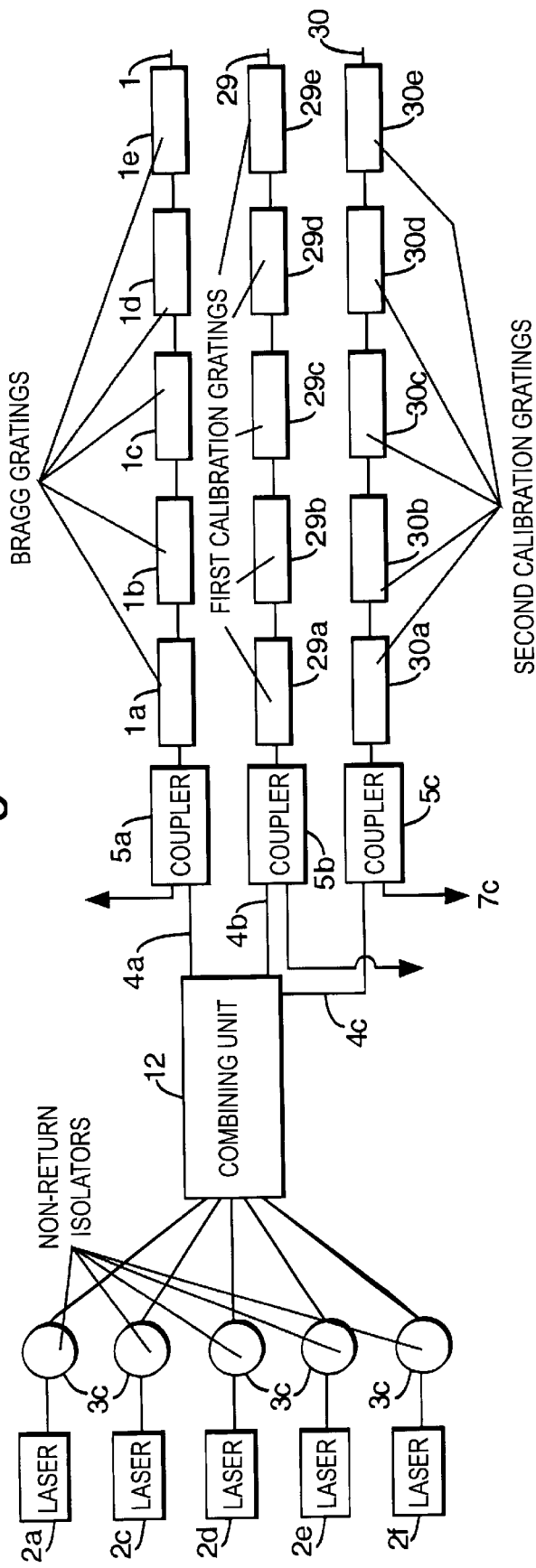
FIG. 12 is a schematic block diagram of the assembly of FIG. 2, showing calibrating means according to the embodiment of FIG. 2.

The calibrating means corresponding to the second embodiment of the present invention is shown in FIG. 12 and includes a series of five first calibration gratings 29a, 29b, 29c, 29d, 29e, each of which are locatable along one of the at least one sensor elements in the form of an optical fibre 29, and a series of five second calibration gratings 30a, 30b, 30c, 30d, 30e, each of which are locatable along one of the at least one sensor elements also in the form of an optical fibre 30. Each of the first and second calibration gratings are of a type made by a programmable ultra violet interference fabrication process, substantially as hereinbefore described in relation to each of the single Bragg gratings. The five first calibration gratings 29a, 29b, 29c, 29d, 29e are each unstrained and locatable in a controlled temperature environment, thereby providing temperature stabilised ratios of the intensity values $(1f_i:2f_i)_T$ corresponding to each of the series of single Bragg gratings 1a, 1b, 1c, 1d, 1e. Each of the series of five second calibration gratings are similarly unstrained, but are subject to substantially identical environmental conditions to each respective single Bragg grating 1a, 1b, 1c, 1d, 1e, thus providing unstrained ratios of the intensity values $(1f_i:2f_i)_U$. The ratios $(1f_i:2f_i)_T$, $(1f_i:2f_i)_U$ and the means for locating each respective single Bragg grating ratio $1f_i:2f_i$ within one of the at least two sinusoidal periods 20, 22 are combinable to determine the phase relationship from which an absolute direction and magnitude of strain on each single respective Bragg grating can be determined.

Figure 13:
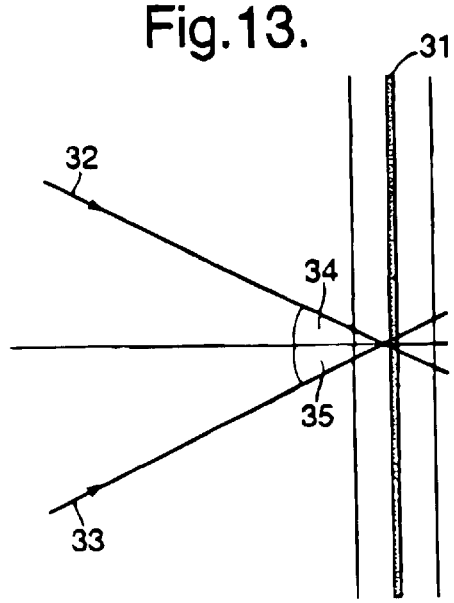
FIG. 13 is a schematic of modulated fibre Bragg grating fabrication parameters according to the embodiments of FIG. 1 or 2.

Thus the single Bragg grating 1a, the first and second calibration gratings 26, 27, each of the series of single Bragg gratings 1a, 1b, 1c, 1d, 1e, and each of the series of first and second calibration gratings 29a, 29b, 29c, 29d, 29e, 30a, 30b, 30c, 30d, 30e in the first and second embodiments of the present invention respectively are substantially identical components. Typically, modulated fibre Bragg gratings are burnt into an optical modulated fibre core 31 through interference of two monochromatic ultra violet beams 32, 33 as shown in FIG. 13, which two beams each have a wavelength of 260 nm and interrogate the fibre core at variable angles 34, 35, as shown in FIG. 13. The angle between the two beams 32, 33 and the duration of exposure thereof on the fibre core controls the pitch and refractive index depth respectively. The ultra violet interference system utilised in the fabrication of the or each of the single Bragg gratings is therefore programmed to expose the fibre core 31 so as to provide the linearly varying chirp 17, the sinusoidal variation in depth of refractive index 21 or the sinusoidal variation in pitch 23 as hereinbefore described, and thus achieve the two or three period substantially sinusoidal reflection response.

The characteristics of a modulated fibre Bragg grating can be described mathematically in terms of pitch, k, refractive index, r, and refractive index depth, d. For a standard fibre Bragg grating the refractive index varies sinusoidally along its length and the pitch is constant:

$$r(x)=r_0(1+\cos(kx)) \text{ and } k=k_0$$

where x is position along the grating. The linear variation in pitch along the grating 17 is described by:

$$k(x)=k_0+k_1 x$$

The sinusoidal variation in depth of refractive index along the grating 21 is described by:

$$d(x)=d_0+d_1\sin(\omega_d x)$$

where $\omega_{d,H}, d_1$ are frequency and amplitude of the sinusoidal depth variation respectively; and the sinusoidal variation superimposed on the linear pitch profile along the grating 23 is described by $$k(X)=k_0+k_1 x+k_2 \sin(\omega_k x)$$

where $\omega_k$, $k_2$ are frequency and amplitude of the sinusoidal pitch so variation respectively. Selection of $\omega_d, d_1$, $\omega_k, k_2$ provide the means of controlling the number of periods 20, 22 comprising the substantially sinusoidal intensity variation.

Figure 14:
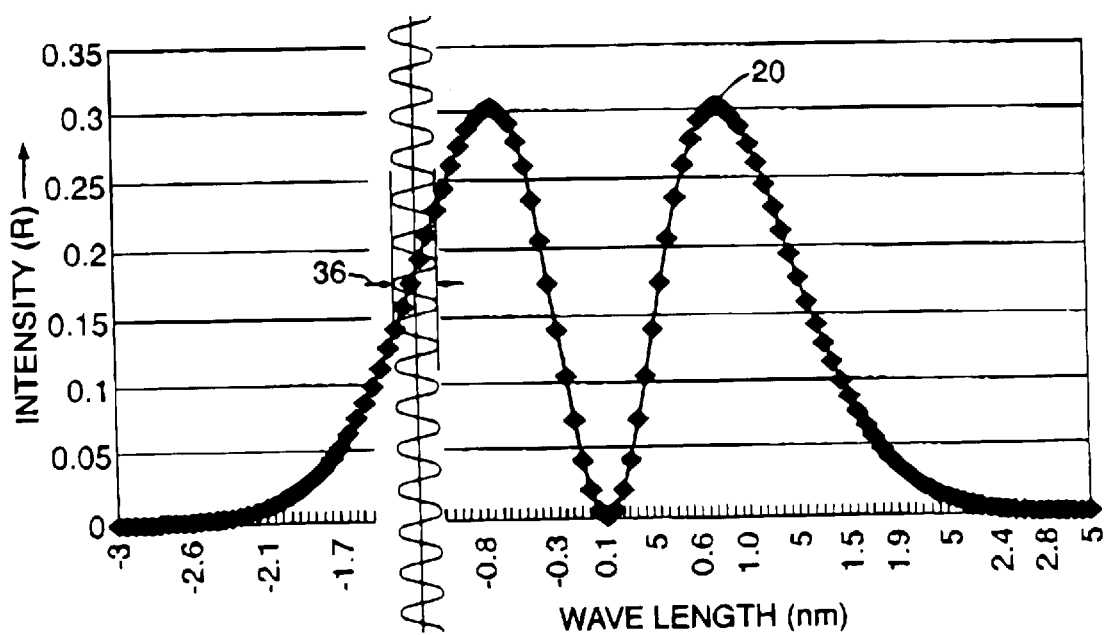
FIG. 14 is a graphical representation of intensity versus wavelength of a frequency modulated light beam of the assembly of FIG. 1 superimposed on the intensity response of FIG. 10.

As described above the means for generating and passing a beam of light into the sensor element 1 includes a light generating source 3a preferably in the form of a semiconductor laser provided with a current supply drive 3b operable to provide an injection current, modulated at a frequency f, to the laser which causes the frequency of the laser light source 3a to deviate therearound at frequency f. This provides a continuous light source into the or each single Bragg grating, and as the or each single Bragg grating 1a is subjected to strain, the grating burnt into the fibre core 31 effectively moves relative to the light source 3a, resulting in a change in reflected light intensity. As the intensity of reflected light varies substantially sinusoidally 20, 22, this strain effects a shift along the sinusoidal intensity response. The effect of the frequency modulation imposed on the laser light source 3a by the current supply 3b is to cause the laser 3a to scan back and forth across a limited region of the substantially sinusoidal intensity response 36, as shown in FIG. 14, and the response of the or each single Bragg grating 1a is detected by photodetector 7. The 2f signal is proportional to the curvature of the scanned region, and the 1f signal is proportional to the slope thereof, such that if the or each single Bragg grating intensity response is a pure sinusoid, the detector 7 will observe sine and cosine signals respectively.

A Lissajous figure of a typical pair of 1f and 2f signals 37, 38 relating to the first embodiment of the present invention having two substantially sinusoidal periods is presented in FIG. 15, and the corresponding profiles are roughly triangular. Each circuit of the Lissajous corresponds to one period of the substantially sinusoidal intensity response, and corresponds to a fixed amount of strain, which fixed amount of strain is 666 microstrain for the two period sinusoidal response 20. In the present case, where the Lissajous approximates a triangle, each point on the Lissajous can be described as a fraction of the 360° circuit, and thus a corresponding fraction of the 666 micro strain. Clearly a relative clockwise or counterclockwise movement along the Lissajous figure for progressive strain measurements will indicate strain direction. In cases where the intensity response is a pure sinusoid, the Lissajous figure will be a circle, and the strain can be extracted via the inverse tangent of the 1f and 2f signals.

The means to determine an absolute direction and magnitude of strain is a combination of calibrating means and means for locating the ratio of 1f:2f within one of the at least two substantially sinusoidal periods 20, 22. The means for locating the ratio of 1f:2f within one of the periods 20, 22 essentially defines a switch-on strain condition. Thus in terms of the Lissajous figure presented in FIG. 15, the means resolve in which signal 37, 38 and thus in which period 20 the switch-on strain reading lies. As described above with reference to FIG. 15, each period corresponds to 666 microstrain, and it is therefore necessary to configure the artefact under examination so as the strain at switch-on can be determined to within 666 microstrain.

The calibrating means, although configured in different ways for the first and second embodiments, is identically utilised to achieve absolute gauging to within a desired resolution of 10 microstrain and is hereinafter discussed with reference to the first embodiment as shown in FIG. 11. The first calibration grating 1a, the single Bragg grating 26, and the second calibration grating 27 all receive the same light input via the waveguide splitter unit 11 as shown in FIG. 11, and the 1f:2f analysis described above with reference to a single Bragg grating 1a is applied to the reflected intensities observed at each of the respective photodetectors 7a, 7b, 7c. The intensity response at the first calibration Bragg grating photodetector 7a, which first calibration grating 26 is located in a stabilised temperature environment, provides a ratio of intensity values $(1f:2f)_T$ to calibrate the laser wavelength. A suitable stabilised temperature environment may be provided by a glass or plastic tube and the first calibration grating 26 may be bonded therein using epoxy resin. The tube may contain a resiliant material such as a silicon polymer and be attachable at one end to the test piece.

The second calibration grating 27, which grating is unstrained and exposed to substantially identical environmental conditions to the single Bragg grating 1a, is used to compensate for temperature effects experienced by the single Bragg grating 1a through its corresponding ratio of intensity values $(1f:2f)_U$. For each ratio of 1f:2f corresponding to the single Bragg grating 1a, corresponding readings from the first and second calibration gratings $(1f:2f)_T$, $(1f:2f)_U$ are required in order to achieve an absolute strain measurement to within 10 microstrain.

Thus the present invention offers absolute gauging of strain, makes use of relatively straightforward fabrication techniques, offers resolution of strain to 10 microstrain and uses low cost electronic components. The second embodiment of the present invention offers an alternative to the conventional fibre Bragg grating networks where real time read out of many sensors presents challenges for signal processing. The present invention offers a high real time bandwidth, good signal to noise ratio, and is configurable to provide strain measurements from a large number of sensors.

What is claimed is:

1. A modulated fibre Bragg grating strain gauge assembly for absolute gauging of strain including at least one sensor element in the form of a length of optical fibre containing, along part its length, means for partially reflecting light, means for generating and passing a beam of light with a spectral feature less than 0.1 nanometers in width into the at least one sensor element where reflection takes place, which reflection is a substantially sinusoidal intensity variation in wavelength over a range of from 2 to 3 nanometers comprising at least two substantially sinusoidal periods such that as the at least one sensor element sustains a change in length resulting from a strain thereon, the reflected intensity varies substantially sinusoidally along the at least two sinusoidal periods, means for receiving and processing the reflected light to establish the light intensity values at one 1f and two times 2f a modulation frequency 1f applied to the means for generating the beam of light, and means to determine an absolute direction and magnitude of strain from a ratio of the intensity values 1f:2f.

2. An assembly according to claim 1, wherein the means for generating and passing a beam of light into the at least one sensor element includes a light generating source in the form of a semiconductor laser, a non-return isolator for receiving the beam of light from the laser, a waveguide splitter unit for splitting the light received from the isolator into at least one output light beam and at least one coupler for receiving one of the at least one output light beams and for passing it into one of the at least one sensor elements.

3. An assembly according to claim 2, wherein said coupler is operable to split the received light beam into two sub-beams, one of which is passed directly into one of the at least one sensor elements via a single mode optical fibre, and to receive from the respective at least one sensor element the light reflected therefrom.

4. An assembly according to claim 3, wherein the means for receiving and processing the reflected light includes at least one photodetector for receiving the reflected light from the coupler, at least one pair of lockin detectors operable to sample the reflected light output from the photodetector, one at a frequency of 1f and the other at a frequency of 2f, and demodulate the samples at these two frequencies, and means for logging the demodulated samples and for establishing the phase relationship between the 1f and 2f values.

5. An assembly according to claim 4, wherein the means for partially reflecting light is a single Bragg grating.

6. An assembly according to claim 5, wherein the semiconductor laser is tuneable to a midpoint of the single Bragg grating.

7. An assembly according to claim 1, wherein the means for partially reflecting light is a series of single Bragg gratings, each of which gratings resonates at a unique frequency.

8. An assembly according to claim 7, wherein the means for generating and passing the beam of light into the at least one sensor element includes a plurality of light generating sources each in the form of a semiconductor laser, each of which lasers is uniquely tuned to a midpoint of one of the series of single Bragg gratings and has a unique and selectable frequency modulation $1f_i$ imposed thereon, a plurality of non-return isolators for receiving an output from each of the corresponding lasers, a combining unit for combining the outputs from each of the plurality of isolators, which combined outputs provide at least one output light beam passable into each of the at least one sensor elements, and at least one coupler each for receiving one output light beam from the combining unit and passing it into one of the at least one sensor elements.

9. An assembly according to claim 8, wherein the means for receiving and processing the reflected light from each of the series of single Bragg gratings includes at least one photodetector for receiving the reflected light from the respective coupler and a plurality of pairs of lockin detectors operable to sample the reflected light output from the detector, one at each corresponding $1f_i$ and the other at each corresponding $2f_i$ frequency.

10. An assembly according to claim 6, wherein the single Bragg grating is of a type made by a programmable ultra violet interference fabrication process operable to impose a variation in refractive index depth and pitch therealong, thereby providing the required substantially sinusoidal variation of reflected light intensity.

11. An assembly according to claim 10, wherein the ultra violet interference system is operable to impose a linearly varying pitch on the single Bragg grating.

12. An assembly according to claim 11, wherein the substantially sinusoidal variation of reflected light intensity has two periods, which two periods are provided by the ultra violet interference system operable to impose a sinusoidal refractive index depth variation along the single Bragg grating, which sinusoidal refractive index depth variation has a frequency and amplitude selectable to provide no more than four periods therealong.

13. An assembly according to claim 1, wherein the substantially sinusoidal variation of reflected light intensity has three periods, which three periods are provided by the ultra violet interference system operable to impose a sinusoidal refractive index depth variation along the single Bragg grating, which sinusoidal refractive index depth variation has a frequency and amplitude selectable to provide at least five periods therealong.

14. An assembly according to claim 11, wherein the substantially sinusoidal variation of reflected light intensity has three or more periods, which three or more periods are provided by the ultra violet interference system operable to superimpose a sinusoidal variation of pitch on the linearly varying pitch.

15. An assembly according to claim 12, wherein the means to determine an absolute direction and magnitude of strain from the strain gauge assembly includes calibrating means for calibrating the ratio of intensity values 1f:2f, and means for locating the ratio of 1f:2f within one of the at least two substantially sinusoidal periods.

16. An assembly according to claim 15, wherein the calibrating means includes a first calibration Bragg grating, a second calibration Bragg grating, the waveguide splitter unit having three output light beams, three couplers and three sensor elements.

17. An assembly according to claim 16, wherein the first calibration Bragg grating is locatable along part of a first of the three output sensor elements, is unstrained and locatable in a controlled temperature environment thereby providing a temperature stabilised ratio of the intensity values $(1f:2f)_T$, the single Bragg grating is locatable along a second of the three output sensor elements, and the second calibration Bragg grating is locatable along a third of the three output sensor elements, is unstrained, subject to substantially identical environmental conditions to the single Bragg grating and provides an unstrained ratio of the intensity values $(1f:2f)_U$, which unstrained ratio $(1f:2f)_U$, temperature stabilised ratio $(1f:2f)_T$ and the means for locating the ratio 1f:2f within one of the at least two sinusoidal periods are combinable with the ratio of the intensity values 1f:2f relating to the single Bragg grating, to determine the phase relationship from which an absolute direction and magnitude of the strain on the single Bragg grating can be established.

18. An assembly according to claim 15, wherein the calibrating means includes a series of first calibration Bragg gratings, each of which first calibration Bragg gratings is locatable along one of the at least one sensor elements, is unstrained and locatable in a controlled temperature environment thereby providing a series of temperature stabilised ratios of the intensity values $(1f_i:2f_i)_T$, and a series of second calibration Bragg gratings, each of which second calibration gratings is locatable along one of the at least one sensor elements, is unstrained, subject to substantially identical environmental conditions to each respective single Bragg grating and provides a series of unstrained ratios of the intensity values $(1f_i:2f_i)_U$, which unstrained ratios $(1f_i:2f_i)_U$, temperature stabilised ratios $(1f_i:2f_i)_T$ and the means for locating the ratios $1f_i:2f_i$ within one of the at least two sinusoidal periods are combinable with the ratio of the intensity values $1f_i:2f_i$ relating to each respective single Bragg grating, to determine the phase relationship from which an absolute direction and magnitude of the strain on each single respective Bragg grating can be established.

19. An assembly according to claim 16, wherein each of said first and second calibration Bragg gratings is of a type made by a programmable ultra violet interference fabrication process operable to impose a variation in refractive index depth and pitch therealong, thereby providing a substantially sinusoidal variation of reflected light intensity.

20. An assembly according to claim 18 wherein the series of single Bragg-gratings and the series of first and second calibration gratings each includes five single Bragg gratings.

21. An assembly according to claim 20 having five sensor elements and five photodetectors.

* * * * *